United States Patent
Dominke et al.

[11] Patent Number: 6,154,688
[45] Date of Patent: Nov. 28, 2000

[54] METHOD AND ARRANGEMENT FOR CONTROLLING A VEHICLE

[75] Inventors: Peter Dominke, Bietigheim-Bissingen; Holger Bellmann, Ludwigsburg; Jens-Olaf Mueller, Leonberg; Torsten Bertram, Duesseldorf; Asmus Volkart, Bietigheim-Bissingen; Christian Grosse, Kornwestheim; Wolfgang Hermsen, Rodgau, all of Germany

[73] Assignee: Robert Bosch GmbH, Stuttgart, Germany

[21] Appl. No.: 09/035,979

[22] Filed: Mar. 6, 1998

[30] Foreign Application Priority Data

Mar. 7, 1997 [DE] Germany .................. 197 09 319

[51] Int. Cl.⁷ .................. H04J 3/02; B60R 16/02
[52] U.S. Cl. .................. 701/1; 701/36; 709/208
[58] Field of Search .................. 701/1, 48, 33, 701/36; 364/468.03, 468.06, 488, 491; 706/26, 919, 921; 707/900, 902, 906, 907, 908; 709/107, 208, 253, 251; 710/110, 126, 243

[56] References Cited

U.S. PATENT DOCUMENTS

| | | | |
|---|---|---|---|
| 5,351,776 | 10/1994 | Keller et al. | 180/79.1 |
| 5,367,456 | 11/1994 | Summerville et al. | 364/424.02 |
| 5,513,107 | 4/1996 | Gormley | 364/424.05 |
| 5,692,186 | 11/1997 | Fukuoka et al. | 395/617 |

*Primary Examiner*—Tan Nguyen
*Assistant Examiner*—Dalena Tran
*Attorney, Agent, or Firm*—Walter Ottesen

[57] ABSTRACT

The invention is directed to a method and an arrangement for controlling a motor vehicle. Several components are arranged in a command hierarchy and the commands for the components flow only from a higher abstraction level into a lower abstraction level and from a higher hierarchial level into a lower hierarchial level. Each component has only one command generator. The components operator-controlled elements are arranged in the command hierarchy as low as possible.

12 Claims, 5 Drawing Sheets

METHOD AND ARRANGEMENT FOR CONTROLLING A VEHICLE

BACKGROUND OF THE INVENTION

A method and an arrangement for controlling a vehicle are disclosed, for example, in U.S. Pat. No. 5,351,776. Here, a control of the entire vehicle at least with respect to the drive train and brakes is suggested. This control has a hierarchial command structure for the control tasks.

The control structure described in U.S. Pat. No. 5,351,776 includes coordinating elements which convert a command from a higher hierarchial level into commands for elements of a lower hierarchial level. The contents of the commands, which are transmitted from above to below in the hierarchial structure, define physical variables which determine the interfaces between the individual hierarchial levels.

The command flow is only from a higher hierarchial level to a lower hierarchial level. The highest hierarchial level is assumed by the driver. The driver then is the sole central command generator. With respect to the term "driver", also assistance systems, navigation systems and traffic guidance systems are understood. The driver command is therefore, corrected if required (for example, by a drive slip control), processed always with the highest priority. For this reason, the driver always operates on the systems and actuators of the system via commands. For a configuration of the vehicle control system of this kind, problems can occur in the structuring of the system and therefore also in the operation of the system. As an example, the driving dynamic control can be mentioned, which drive-dynamically stabilizes the vehicle via an intervention at the engine to reduce the engine power and via a brake intervention to build up a yaw torque although the driver actuates the accelerator pedal for formulating the desire for propulsion. This example shows that the driver command with respect to vehicle propulsion is overridden completely in favor of the desire for driving stability. Accordingly, the driver command has not the character of a command for the actuating systems which must be in any event be executed. From this, it results that the driver does not stand with all operator-controlled elements at the highest hierarchial level and that the driver is also not the single central command generator in the entire vehicle.

SUMMARY OF THE INVENTION

It is an object of the invention to optimize the issuance of commands in a hierarchial command flow.

The method of the invention is for controlling a vehicle having a system incorporating a plurality of components for controlling the vehicle. The method includes the steps of: arranging the components in the context of a command hierarchy including a plurality of hierarchial levels arranged one above the other with commands flowing only from a higher hierarchial level to a lower hierarchial level; providing only one command generator for each component; arranging a coordinating element for the system in the uppermost hierarchial level; allocating at least some of the plurality of the components to the coordinating element so that the allocated components are subordinate to the coordinating element; and, utilizing the coordinating element to coordinate the functions of the allocated components via commands.

With the solution provided by the invention, the issuance of commands in a hierarchial command flow is clearly structured. It is especially advantageous in this context that, within the hierarchial command flow, a coordinated assignment of several components is permitted only by one component. Only this component is the command generator of these components so that, within the structure of the entire vehicle, only command trees having one root occur. In an advantageous manner, command conflicts are avoided thereby and a clear allocation of responsibilities is provided to the individual components.

Furthermore, the possibility for a higher order optimization of the operating performance of the vehicle (influenced by the composite of all vehicle systems) is provided under view points such as fuel consumption, environmental compatibility, safety, comfort, et cetera.

It is especially advantageous that the solution of the invention facilitates the overview and the understanding of the vehicle structure because the same structuring for the issuance of commands is used on all levels considered.

It is especially advantageous that components, which are largely independent of each other, are provided having interfaces defined for the issuance of commands and the receiving of commands. From this, independent flexible development and checkability of the components results as well as increased flexibility in the development and shorter development times and improved exchangeability of individual components.

BRIEF DESCRIPTION OF THE DRAWINGS

The invention will now be described with reference to the drawings wherein.

DESCRIPTION OF THE PREFERRED EMBODIMENTS OF THE INVENTION

Figure 8:
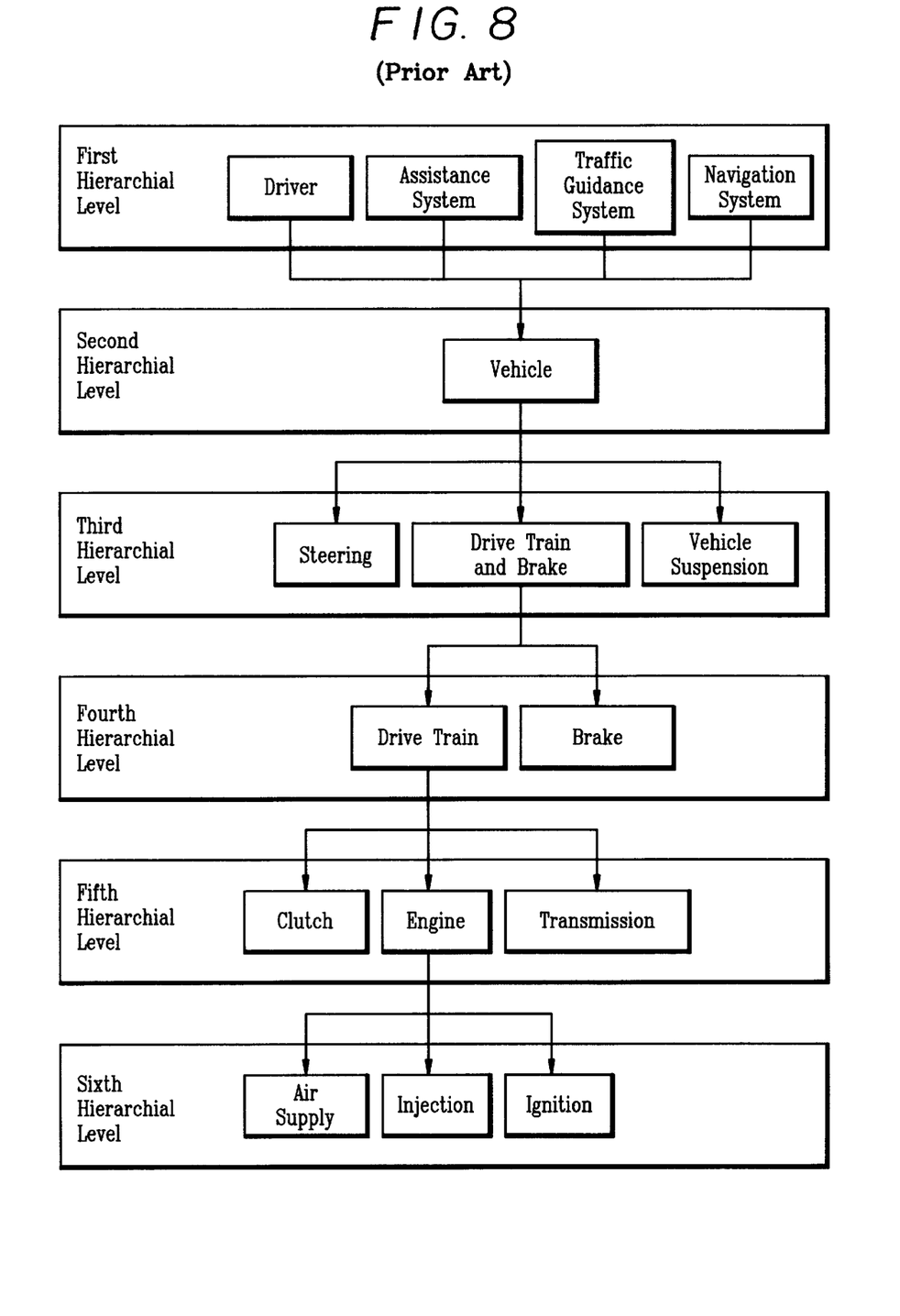
FIG. 8 shows, in contrast to FIG. 7, the command structure known per se.

In the state of the art, an embodiment for a vehicle control system having hierarchial command flow is known. FIG. 8 shows the embodiment known from the state of the art.

Here, six hierarchial levels are provided. The first hierarchial level is defined by the components: the driver, assistance systems (for example, road speed controller, distance controller, et cetera), traffic guidance systems and/or navigation systems. These individual components issue commands to a second hierarchial level to which a coordinating element for the vehicle is assigned. This coordinating element forms further commands from the commands supplied thereto for the following: steering, a coordinating element "drive train and brake" and, if required, for suspension control. These three elements are arranged in a third hierarchial level. The coordinating element "drive train and brake" converts the command issued thereto into commands for a fourth hierarchial level wherein respective coordinating elements are arranged for the drive train and the brake control. The coordinating element for the drive train in the fourth hierarchial level converts the command supplied thereto into commands for the fifth hierarchial level wherein clutch control and transmission control as well as a coordinating element for the engine are provided. The coordinating element for the engine converts the commands supplied from the coordinating element "drive train" into commands for a sixth hierarchial level wherein control elements for the following are arranged: the air supply, injection and ignition of the internal combustion engine.

A control structure of this kind sets the driver and the driver-equivalent control systems at the highest hierarchial level so that here the initially mentioned problematic can occur.

The future development in the area of motor vehicles leads to a situation wherein an increasing number of functions, which go beyond the basic functions, are to be connected into the vehicle control. The complexity of the vehicle structures increases with an increasing number of functions. To do the following, namely: to minimize the cost associated therewith, to manage the complexity, to maximize the functionality and to maximize reliability, future control apparatus are to be integrated into a system group and embedded in a total structure of the vehicle and its ambient. These requirements relate, in an increasing manner, also to the software structuring and software development. A structuring of software must provide that a modular development and checkability of the individual functions in the form of components is possible. A condition precedent for such a modular configuration of individual functions and a simple exchangeability of the components of a total structure is a clear determination of the interfaces of these components. An interface of the components serves the issuance of commands. A clear issuance of a command, which clearly describes the command generator and the command receiver as well as the interactions permitted between these components, results in an understandable structure having components which are otherwise independent of each other. The logical connection of the components via the communication relationship of the issuance of commands should be reduced to a tolerable minimal level and be applied only for a coordination of components. Explicit commands are necessary for such a coordination. It has been shown that the following structuring items are the most suitable for the command issuance and the feedback relationship coupled to the command:

(a) each component receives at least one command (that is, either by another component or the component has an inherent task);

(b) each component has precisely one command generator;

(c) exactly one component is a command receiver of commands to its system. This component is called input component and receives no further commands from components of the system;

(d) components having an inherent command can issue no commands;

(e) if the component is a target component of a command issuance, then, in a refinement of these components (subsystem), the input component of the next detailing level is the target component of the command relationship;

(f) if the component is source component of a command issuance, then, for a refinement of this component (subsystem), precisely one desired component of the next detailing level is source component of the command relationship; and, (g) each feedback relationship is coupled to a command. A feedback relationship is opposite to the command issuance, that is, the source and target components of the command issuance are exchanged with respect to their functions.

A command, in this context, is understood to be an input of objectives and peripheral conditions. The command issuance takes place from the command generator to the command receiver. The responsibility to execute a command is connected to the issuance of the command or, if this is not possible, a feedback must take place. A feedback is information which one component (command receiver) sends to another component (command generator) with reference to the specific command. Feedbacks can be status feedbacks, conflict feedbacks or result feedbacks which, in addition to a value, can also be provided with a suggestion for further processing.

In addition to a command interface, information interfaces are also provided via which one component can obtain data from another component. Information inquiries or request relationships can exist via an information interface. There must be a clear differentiation between a command and a request for data. With respect to a command, the above-mentioned definition of the responsibility is coupled to execute the same. The command receiver has only one command generator and receives therefrom only coordinated commands. For requests, this does not necessarily apply because, as a rule, several requests can be made to one component which must thereafter be coordinated in the component. For the coordinating task and the initiation of the component specific task, an explicit command is still required. The request is treated in the structuring configuration in such a manner that a component receives a command to consider the requests which are made thereto. Several requests to one component require a coordination by the component itself and, in the case of disjunctive requests, a conflict resolution by a higher-order component. The conflict resolution cannot be performed by the component to which the request has been made because the component does not know the background which led to the request.

The above-mentioned general structuring is made clear in the following.

Figure 1:
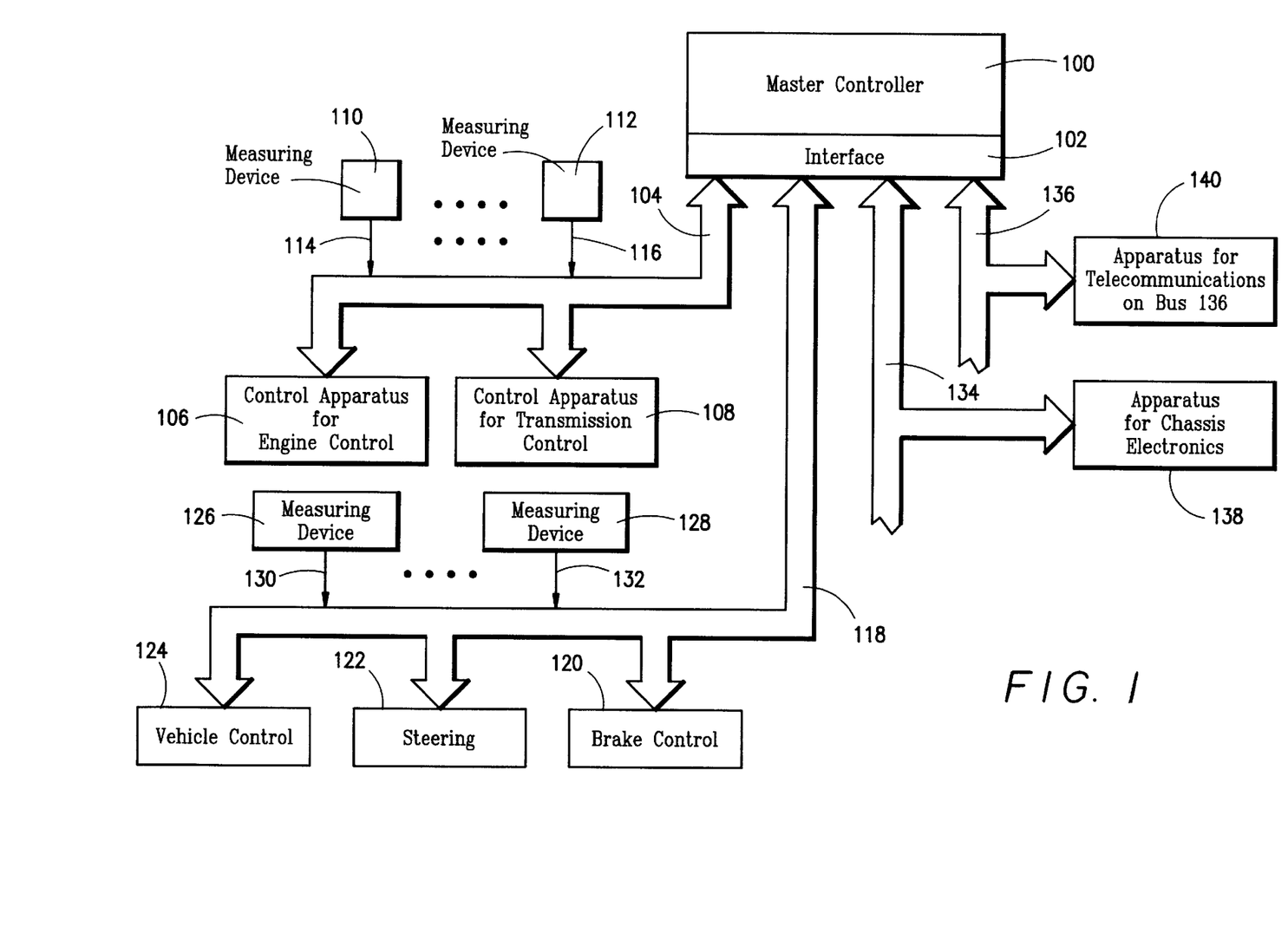
FIG. 1 is exemplary of a hardware configuration of a network control system for a vehicle.

In FIG. 1, an example for a hardware configuration of a control system for a vehicle is shown in the context of a block circuit diagram. Here, reference numeral 100 identifies a so-called master controller which includes, inter alia, an interface 102 (gateway) to which various bus systems are connected. The allocation of these bus systems is exemplary.

The first bus system 104 defines the communication between the master controller 100 and the elements controlling the drive torque. The bus 104 connects the master controller 100 to a control apparatus 106 for engine control and a control apparatus 108 for transmission control.

On the other hand, the bus 104 is connected via corresponding lines 114 to 116 to respective measuring devices 110 to 112. These measuring devices detect the operating variables of the engine and/or of the vehicle such as: road speed, engine rpm, supplied air quantity or air mass, load, exhaust-gas composition, engine temperature, transmission ratio, shift state of a converter, knocking tendency, et cetera. These operating variables are to be evaluated for the control of the drive torque.

A second bus 118 connects the master controller 100 (that is, its interface 102) to elements for brake control 120, steering 122 and/or for vehicle control 124.

In the same manner as presented above, operating variables are transmitted from measuring devices 126 to 128 via respective connecting lines 130 to 132 to bus 118. These operating variables are those of the engine and/or of the vehicle such as wheel rpms, spring/shock absorber displacements, braking forces, et cetera. Furthermore, additional bus systems 134 and 136 are provided which preferably operate at different transmitting rates than the systems 104 and 118. These bus systems connect the master controller to apparatus 138 of the chassis electronics (generator, light, seat position, window lifters, sun-roof drive, et cetera) on bus 134 and, if required, to apparatus 140 for telecommunications on bus 136. The actuating elements and actuators, which are necessary to influence the engine, brake system, et cetera, are either connected to the particular control unit or to the particular bus.

The configuration shown in FIG. 1 presents an example which can be differently configured in other embodiments, for example, by omitting the master controller 100. What is essential is that the command issuance is independent of the specific configuration of the control system on a hardware level and permits a configuration of the individual elements of the control system which is optimized with respect to space, susceptibility to faults or the like. On the other hand, the command issuance provided by the invention permits an adapted hardware configuration when, for example, in a specific case of application, the sources mechanical energy (engine and transmission) and the control for vehicle movement (drive train and brake) are controlled via respective control units while the responsible higher-order coordinator is placed in the master controller 100.

In the following, the above-mentioned structuring will be explained in greater detail.

Each component receives at least one command either by another component or by the component itself (inherent command). Components, which do not receive commands from another component (to which, however, information requests are made for the preparation of information such as measured values), require a so-called inherent command for making the information available. In this case, the component is virtually its own command generator. This structuring ensures that no component in the hierarchial command flow remains unconsidered as a command receiver but is bound to this command receiver. Likewise, a component can only be a command generator when it has previously received a command from another component. Each component has a task, otherwise, the component is superfluous. The components take care of the requested tasks substantially autarch under the defined peripheral conditions. The commands (tasks) are specified by target information and peripheral conditions. For the peripheral conditions, one can differentiate between general peripheral conditions and command-related peripheral conditions. The command-related peripheral conditions give, for example, with the transfer of values, the quantization thereof as well as the needed time request (timing).

In addition, each component has only one command generator from which it can, however, receive several commands. This involves a clear conflict resolution exclusively by the command generator. Competing commands to a component must therefore be coordinated by the command generator. Within the hierarchial command flow, the command generator can be clearly identified for each component in the case of a conflict and thereby the conflict solver particular for the component can be named. Such a conflict case could be, for example, when a command cannot be executed under the given peripheral conditions. In order to solve conflicts, it is possible to trace the command back according to the hierarchically arranged command generator. Usually, the coordinator for the commands is to be placed where the command flow branches. The graphic illustration of the command flow then leads to a command tree having a root (input component).

Components having an inherent command cannot issue commands. Within a system, and to increase clarity, only one command tree should exist. Each command within a system must be part of the command flow emanating from the input component. Excepted herefrom are inherent commands. By means of these rules, command cycles and further command trees can be avoided.

Figure 2:
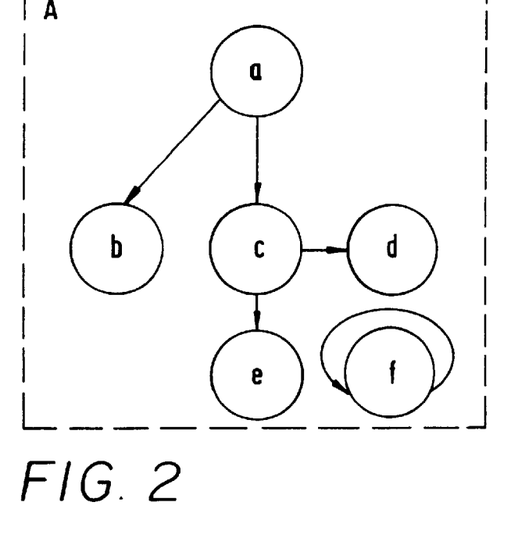
FIGS. 2 to 6 show in general form the command structure according to the invention and the structure of the feedback of the command receivers to the command generators.
Figure 3:
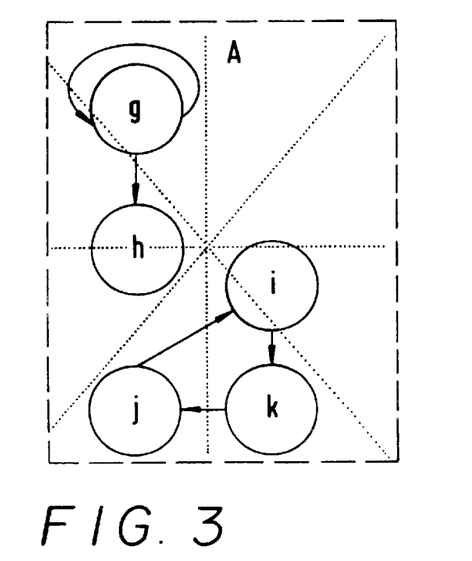

This is shown in FIGS. 2 and 3 for the issuance of commands within a system. FIG. 2 shows a system A (for example, a system for controlling the vehicle movement) which comprises the components a, b, c, d, e and f. The command flow leads from component a (input component) of the system to component b and, via the component c, to the components e and d. The component f has an inherent command. By applying the structuring specifics, the above objectives are reached.

In contrast to the above, FIG. 3 shows a command structure within the system A which cannot be combined with the above-mentioned structuring specifics and therefore is not permitted. The system A has the components g, h, i, j and k. The components k, j and i are connected via a cyclical command flow; whereas, the components g and h define a further command tree. The command structure illustrated is unclear and the components cannot be simply exchanged because of their mutual dependency (see components i, j and k).

If the commands go beyond the system boundaries, (for example, system A, control of the vehicle movement, to system B, source of mechanical energy), then it applies that precisely one component of the system is command receiver of the commands to its system (input component). This component is called input component and receives no further commands from components of the system. The hierarchial command flow makes possible a clearly understandable concept for the coordinated issuance of commands and for conflict resolution because the commands to a system reach the system exclusively via the input component. A conclusion can be then drawn retrospectively on the coordinator via the input component of the system. This coordinator is responsible for the conflict resolution. The command to the system always ends at the input component. From there, with the exception of inherent commands, all commands are derived for the components of the system.

If the component is a target component of an issued command, then, for a refinement of this component (subsystem), the input component of the next detailing plane is the target component of the command relationship. For refining a component, a command must always end at the input component of the next detailing stage because, otherwise, a component of the system can have two command generators. Per definition, the command flow within a system to the other components can emanate only from the input component. Correspondingly, only one component of the next detailing level is the source component of the command relationship when the component is a source component of a command issuance and is refined (subsystem). The allocation of the source components of a command issuance takes place under the view point of relieving the input component of the subsystem and is, however, coordinated via the command issuance within the subsystem.

Figure 4:
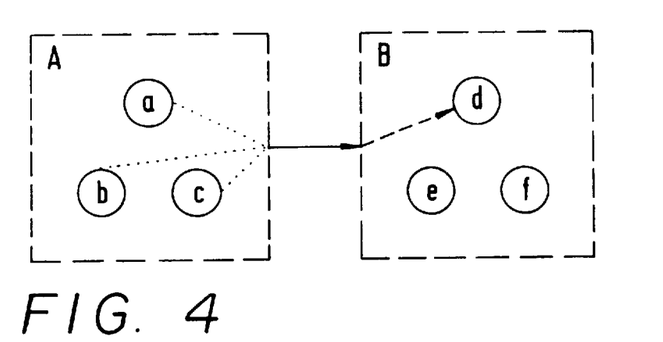

This is shown in FIG. 4. There, two systems A and B are shown. System A has components a, b, c and system B has components d, e and f. A command relationship exists between the two systems. In correspondence with the above-mentioned rules, one of the components a, b or c is a source component of the command relationship (indicated are the possible source components; in a specific application, only one of the possibilities is realized); whereas, one of the components d, e, f (here d) is input component and therefore command receiver of system B.

The command from A to B leads, for the case that c is command generator in the refinement A, directly from c to B. This is shown by the command arrow which begins at c and ends at B. The command to B is then transmitted in a refinement of B to the input component d. With this procedure, a semipermeable structure can be realized which supports the exchangeability and reuse.

Figure 5:
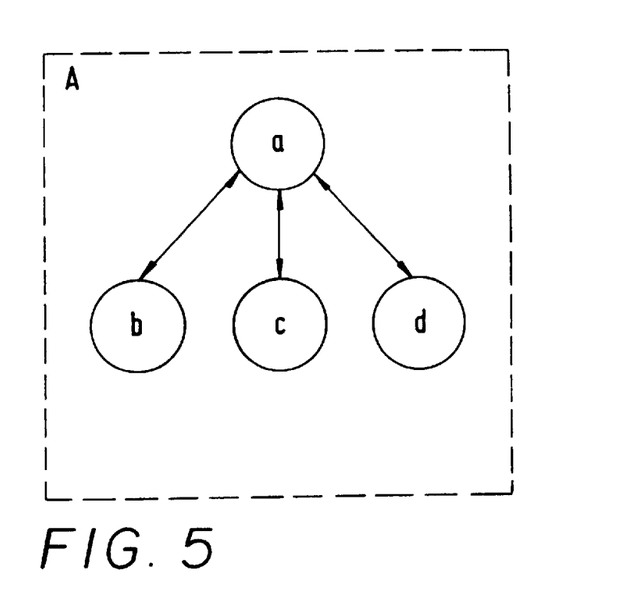
Figure 6:
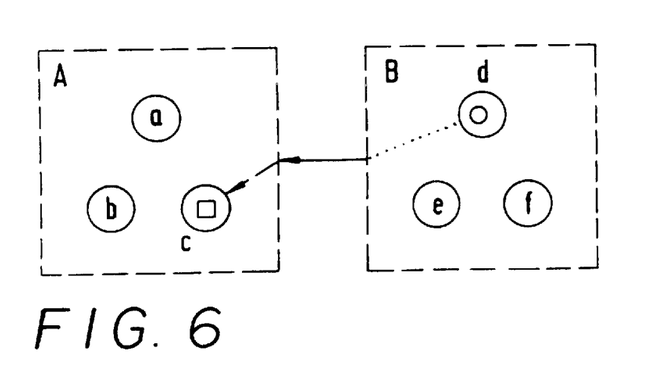

The above applies also for feedback relationships. Each feedback relationship is coupled to a command. The feedback relationship is opposite to the issuance of a command, that is, source component and command recipient are exchanged in their functions (see FIGS. 5 and 6). The feedback relationship permits a communication with reference to an available command and must therefore be directed opposite to the command issuance. Possible contents of the feedback relationship are status feedbacks, conflict announcements or result announcements which, in addition to a value, can also be provided with a suggestion for further processing. FIG. 5 shows the feedbacks within a system A having the components a, b, c and d. The command issuance (solid arrow) leads from the component a to the components b, c and d. Correspondingly opposite, the feedback relationship to component a takes place oppositely (open arrow). Beyond the system boundaries, the above applies. FIG. 6 shows a system A having the components a, b, c and a system B having components d, e and f. The feedback relationship of system B to system A is shown. The command receiver (system B, component d) is source component of the feedback relationship; whereas, the command generator (system A, component c) is target component of the feedback relationship.

The above-mentioned structuring specifics therefore do not relate only to the components of one system but apply also to the refinement of components (subsystems) which are command generator and command receiver. In addition to the clear structuring for the command issuance in a hierarchial command flow, the type of commands is likewise of significance for a clear and easily understandable structure of the total vehicle. Here, a small number of command types should be distinguished because then the type of interface which occurs can be reduced to a low number and the understandability of the structure can be further increased. As mentioned above, each component has specific tasks for which it is responsible for the execution thereof. Objectives and peripheral conditions are pregiven as commands or tasks. Commands, which can be processed in an autarch manner by the component, are described in its specification and require no external commands in detailed form. Commands which require higher level coordination, are pregiven by the command generator in the form of target values and peripheral conditions. The results of the completion of the commands are available for other components in both cases. The path of the command execution is not known outside of the components.

For triggering the command processing in correspondence to the specification, the component receives an implicit command in the form: "execute the commands of the specification while considering the peripheral conditions there specified!".

There are commands which cannot be executed in an autarch manner because, for example, a coordination and/or an adaptation with other components is required. These commands are taken out of the component specification and are initiated by a detailed command issuance by the command generator via an explicit command. This command generator also issues an implicit command for executing the specification. In this way, specific interfaces result via which the command generator issues the objectives and peripheral conditions of a command to the component in accordance with an explicit command in dependence upon the situation. An example for a command of this kind can read: "make available the mechanical energy x watts with a high dynamic in y seconds!" The data as to time, quantization and unit of a quantity to be transferred are necessary if they influence the characteristics of the system. The precise description of the requirements on a component reinforces their exchangeability.

Under circumstances, a value and a time data are not adequate to execute a command. To influence reaching the objective, further peripheral conditions are then necessary. As an example, a command to an internal combustion engine can be considered with respect to a mechanical energy which the engine makes available at a crankshaft. For this command, the following peripheral conditions are primarily of significance:

(a) an rpm interval which is to be maintained because the consumer can be operated above a minimum rpm and below a maximum rpm;

(b) the demands on the dynamic of making energy available because the consumer with the consumption characteristic must adapt to the engine or the engine must adapt to the consumer. No value is transmitted if the consumer can accommodate to the normal dynamic; otherwise, a gradient is available as a peripheral condition in addition to the command. The gradient expresses the required dynamic;

(c) a logic information as to the self protection of the engine which is to be maintained. It is conceivable that, in critical traffic situations, the component protection must be of secondary importance relative to the general safety;

(d) an information as to the force connection between the engine and the transmission. This information indicates whether the force lock in the drive can be interrupted or if this is not permitted.

Figure 7:
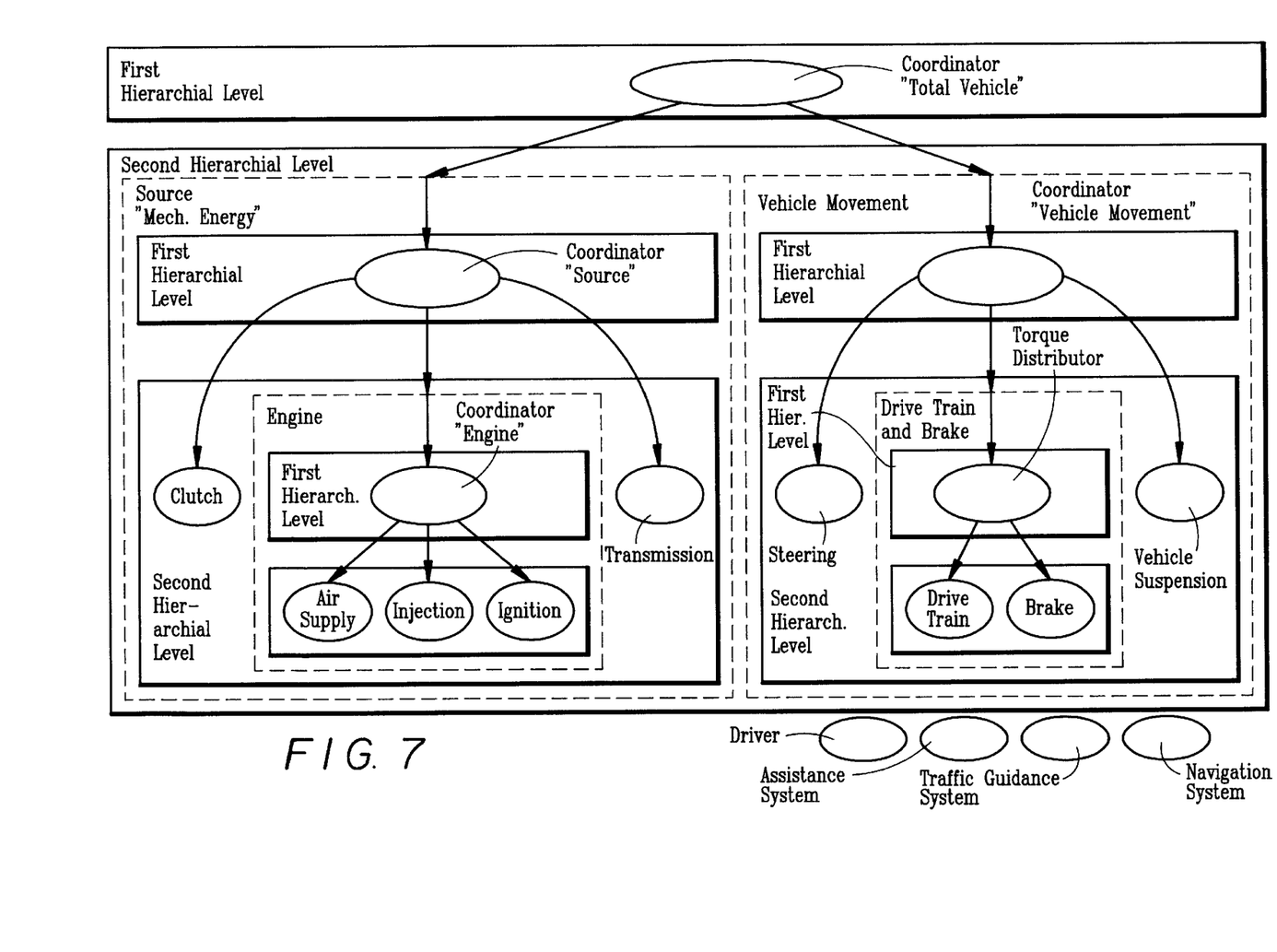
FIG. 7 shows the command structure with respect to a preferred embodiment.

The preferred embodiment shown in the state of the art can be as shown in FIG. 7 while considering the structuring for hierarchial command issuance and the illustrated command types.

Different systems {source "mechanical energy" and "vehicle movement") are shown whose components (engine or drive train and brake) are further refined and form so-called subsystems. The coordinator for the total vehicle is arranged in a first hierarchial level of the total system. This coordinator has command relationships into a second hierarchial level wherein the systems "source mechanical energy" and "vehicle movement" are arranged. Receiver of the commands of the total vehicle coordinator is the input component of the systems which are arranged in the first hierarchial level of the particular system. For the system "source mechanical energy", this is the coordinator of the source; whereas, for the vehicle movement, the coordinator of the vehicle movement is input component of the system. The components (clutch, engine and transmission) are arranged in the second hierarchial level of the system "source mechanical energy". A command relationship is present between these components and the coordinator of the source in the first hierarchial level. Correspondingly, the components "steering", "drive train and brake" as well as "suspension" are arranged in the second hierarchial level. A command relationship likewise is present between these components and the vehicle movement coordinator. The component "engine" of the system "source mechanical energy" in the second hierarchial level is further refined.

Corresponding refinements result also for the two other components. The component "engine" has a first hierarchial level wherein the input component is arranged as command receiver of the coordinator of the source. This coordinator for the engine has command relationships to a second hierarchial level of the subsystem wherein components are arranged for controlling the air supply, the injection and the ignition. These components too can be further refined. Correspondingly, the component "drive train and brake" is further refined in the system "vehicle movement". The first hierarchial level of the subsystem is defined by a torque distributor which is the input component of the subsystem and command receiver of the command generator "coordinator of the vehicle movement". The torque distributor has command relationships to a second hierarchial level of the subsystem which includes the drive train and brake components. Here too, the components "steering" and "suspension" (not shown refined) can experience a corresponding refinement, likewise the components of the subsystem "drive train and brake". The component "drive train" does not contain in its refinement the components engine, coupling and transmission. Rather, the component drive train contains components which determine, for example, the propulsion wheel torques and, while considering the differential, the transmission output torque in accordance with the requirements of the operator-controlled elements, the driving stability system and the assistance system. Compared to FIG. 8, it is significant that components (for example, air supply, injection, ignition) together with a coordinator (coordinator engine) define a system (engine) which surfaces at a higher viewing level (source mechanical energy) as engine component in addition to the components clutch and transmission. In contrast to FIG. 8, it is likewise significant that the source "mechanical energy" is separated from the command flow via the drive train and the brake. The interfaces are defined in a preferred embodiment as in the state of the art. Accordingly, the interface between the total vehicle coordinator and the source mechanical energy coordinator defines the output torque and the interface between the source coordinator and the coordinator "clutch, transmission and engine" defines clutch position, the transmission ratio and the engine torque. Correspondingly, the interface between the total vehicle coordinator and the vehicle movement coordinator is defined by the vehicle movement desired values in the direction of three degrees of freedom (for example, acceleration in the longitudinal direction or road speed). The interface between the coordinator and the torque distributor is defined by the wheel torque; the interface between the coordinator and the steering is defined by the steering angle and the interface between the coordinator and the suspension, for example, is defined by the spring displacement. In the preferred embodiment, the interface between torque distributor and brake is defined by the brake torque and, the interface between the torque distributor and the drive train is defined by the propulsion torque.

The hierarchial levels can be found within the levels under consideration. However, no continuous command hierarchy from a central component "driver" to the actuator exists. The distribution of the operator-controlled elements (driver, assistance system, traffic guidance system and navigation system) over the entire structure of the vehicle is indicated by the separation of the components driver, assistance system, traffic guidance system and navigation system from the structure shown in FIG. 7. For the arrangement of these components or parts of these components in the total structure of the vehicle, the basic premise applies that each component is arranged in the command hierarchy only as high as necessary and, at the same time, as low as possible. For example, the accelerator pedal with which the driver formulates the propulsion command is preferably arranged in the component drive train. A brake pedal is purposefully arranged in the system "vehicle movement" and there in the second hierarchial level of the component "drive train and brake" for the component "brake". Operator-controlled elements, which are arranged in a higher hierarchial level, are operator-controlled elements which operate on several systems (for example, the ignition lock). This is to be assigned, for example to the coordinator "total vehicle", in the first hierarchial level of the total structure.

In comparison to FIG. 8, only one command generator exists for each component. Further, the component "driver" is arranged no longer as a central command generator at the highest hierarchial level. Individual hierarchial levels are given only within a specific system. The structure comprises components which contain as system group subsystems or components. In this way, entire command flow or the components participating therein are not viewable on one viewing level. The component capsulation achieved thereby supports the exchangeability and the flexible development of systems which are independent of each other.

The operation of the control system illustrated in FIG. 7 is shown with respect to an example of an acceleration operation wherein at least one drive wheel tends to spin. First, the driver actuates the accelerator pedal and advises the coordinator "drive train" of the desired acceleration. The total vehicle coordinator in the first hierarchial level inquires at the coordinator "source" as to the mechanical energy to be made available by the source "mechanical energy" (for example, torque). Correspondingly, the coordinator "total vehicle" interrogates coordinator "vehicle movement" a variable which the coordinator "vehicle movement" makes available from its subsystem "drive train and brake". There, the torque distributor determines, for impermissible drive slip, a corresponding reduction of the mechanical energy, which is desired by the driver, for the propulsion. The actual drive slip control therefore lies in the vehicle movement. Here, the monitoring of the performance of the wheels takes place. This means that neither the coordinator "total vehicle" nor the source "mechanical energy", and therefore the engine, know the basis for a reduced output torque request. This knowledge is not necessary for the above-mentioned components for taking care of their commands. The coordinator "total vehicle" forms (from the supplied information in accordance with a known strategy) commands to the source "mechanical energy" with which the source makes available the necessary engine energy which is maximum for a stable propulsion. In the special case, the coordinator "total vehicle" gives the coordinator "source" a command that adjusts an output torque value determined by the system vehicle movement. The source coordinator defines corresponding commands for adjusting this input value for the components "clutch", "engine" and "transmission" which the coordinator "engine" converts into actuator commands for the air supply, injection and ignition. The brake intervention during the drive slip control is effected exclusively in the component "drive train and brake" by the coordinator of the torque distribution.

It is understood that the foregoing description is that of the preferred embodiments of the invention and that various changes and modifications may be made thereto without departing from the spirit and scope of the invention as defined in the appended claims.

What is claimed is:

1. A method for controlling a vehicle having a system incorporating a plurality of components for controlling the vehicle and the components including at least one operator-controlled element, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

arranging said operator-controlled element in a command hierarchy in the uppermost level in which data of said operator-controlled element are evaluated to form a command; and, utilizing said coordinating element to coordinate the functions of said allocated components via commands.

2. The method of claim 1, wherein said allocated components, in turn, have components which are configured as subsystems.

3. The method of claim 1, wherein precisely one component of said system is a command receiver which receives commands to the system from the higher-ranking abstraction level.

4. A method for controlling a vehicle having a system incorporating a plurality of components for controlling the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein components having inherent commands exist which issue no commands to the outside.

5. A method for controlling a vehicle having a system incorporating a plurality of components for controlling the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein feedback relationships are provided between said components which are coupled to a command and over which information is conducted as to the execution of the command to the command generator; and, wherein the feedback relationship is always opposite to command issuance.

6. A method for controlling a vehicle having a system incorporating a plurality of components for controlling the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein the commands are either executed as an implicit command, after one component executes the commands, which are given in the specification of said one component, or are configured as explicit commands for which detailed targets as well as time-dependent and further peripheral conditions are transmitted.

7. A method for controlling a vehicle having a system incorporating a plurality of components for controlling the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein a coordinator is arranged on a high abstraction level in the first hierarchial level for the total vehicle; and, said coordinator coordinates the systems arranged in a second hierarchial level.

8. A method for controlling a vehicle having a system incorporating a plurality of components for controlling the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein said systems arranged in said second hierarchial level are a mechanical energy source and vehicle movement.

9. A method for controlling a vehicle having a system incorporating a plurality of components for controlling the vehicle and a source of mechanical energy, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein the source of mechanical energy has a coordinator for said source in a first hierarchial level; and, components engine, transmission and clutch are in a second hierarchial level.

10. A method for controlling a vehicle having a system incorporating a plurality of components for controlling the vehicle and one of the components being an engine of the vehicle, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein the engine is further refined; a coordinator is provided for said engine in a first hierarchial level; and, said coordinator issues commands to the components for adjusting the air supply, injection and ignition in a second hierarchial place of the subsystem.

11. A method for controlling a vehicle having a system incorporating a plurality of components for controlling the vehicle and having a system defining vehicle movement, the method comprising the steps of:

arranging said components in the context of a command hierarchy including a plurality of hierarchial levels arranged one above the other with commands flowing only from a higher hierarchial level to a lower hierarchial level;

providing only one command generator for each component;

arranging a coordinating element for said system in the uppermost hierarchial level;

allocating at least some of said plurality of said components to said coordinating element so that the allocated components are subordinate to said coordinating element;

utilizing said coordinating element to coordinate the functions of said allocated components via commands; and, wherein the system defining vehicle movement has a coordinator for the vehicle movement in a first hierarchial level which outputs commands to components steering, suspension and drive train and brake in a second hierarchial level.

12. An arrangement for controlling a vehicle, the arrangement comprising:

a plurality of components arranged in a command hierarchy wherein commands always flow from a higher abstraction level to a lower abstraction level and from a higher hierarchial level to a lower hierarchial level;

said components including at least one operator-controlled element;

each component having only one command generator;

a coordinating element for the entire vehicle arranged in a high abstraction level;

a plurality of components subordinated to said coordinator;

said operator-controlled element being arranged in a command hierarchy in the uppermost level in which the data of said operator-controlled element are evaluated to form a command; and, said coordinating element being adapted to coordinate the function of the subordinated components via commands.

* * * * *